United States Patent [19]
Gonzalez

[11] 3,962,801
[45] June 15, 1976

[54] VERTEBRAL COLUMN FOR AN ANTHROPOMORPHOUS DUMMY

[75] Inventor: Boris Gonzalez, Issy-les-Moulineaux, France

[73] Assignee: Societe Anonyme Automobiles Citroen, Paris, France

[22] Filed: May 19, 1975

[21] Appl. No.: 578,384

[30] Foreign Application Priority Data
June 11, 1974 France .............................. 74.20192

[52] U.S. Cl. .................................................. 35/17
[51] Int. Cl.² ............................................ G09B 23/00
[58] Field of Search ......................................... 35/17

[56] References Cited
UNITED STATES PATENTS

| | | | |
|---|---|---|---|
| 979,147 | 12/1910 | Fryette | 35/17 |
| 2,108,229 | 2/1938 | Metz | 35/17 |
| 2,197,975 | 4/1940 | Fleet | 35/17 |
| 3,762,070 | 10/1973 | Culver | 35/17 |

*Primary Examiner*—Harland S. Skogquist
*Attorney, Agent, or Firm*—Lewis H. Eslinger; Alvin Sinderbrand

[57] ABSTRACT

The invention relates to a flexible vertebral column with variable tension guying for an anthropomorphous dummy.

According to the invention the vertebral column comprises vertebrae which laterally and dorsally carry radial processes and four lugs alternating with the said processes. The lugs as well as the center of each vertebra are provided with openings for the passage of cords which are secured to the base of the skull and to the top of the pelvis which carry anchor plates. The tension of one cord which passes through the center of the vertebrae and the intervertebral discs is regulatable by a nut and ensures that the desired stiffness of the column is maintained. Other, slightly elastic cords which pass into the lugs simulate the paravertebral muscles. Further slightly elastic cords guided in the shoulder blade area simulate in regulatable manner the dorsal muscles by means of tighteners.

A particular application of the present invention is in the research and control of automobile equipment.

5 Claims, 4 Drawing Figures

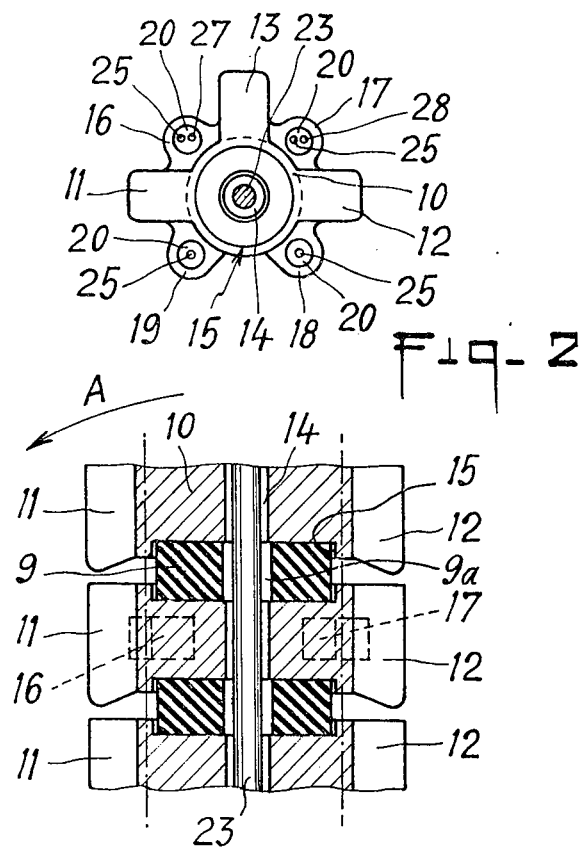
Fig-2
Fig-4
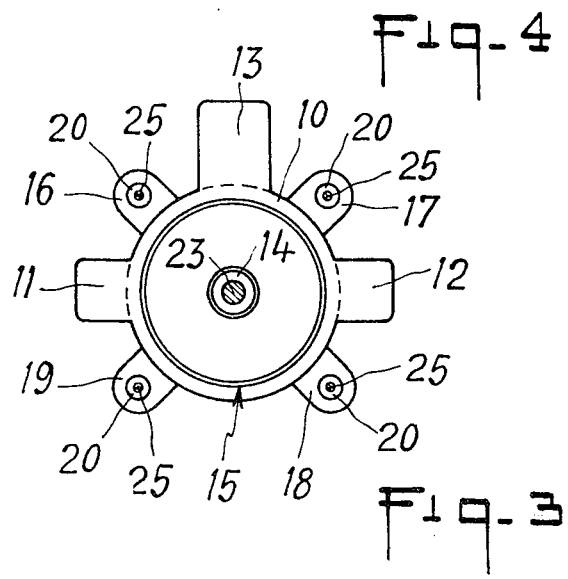
Fig-3

VERTEBRAL COLUMN FOR AN ANTHROPOMORPHOUS DUMMY

The present invention relates to a flexible vertebral column with variable tension guying for an anthropomorphous dummy.

Research on providing maximum safety and comfort when travelling in an automobile is based on simulating the conditions of use of the said vehicle and the behaviour of the passengers travelling therein under these conditions. Although when simulating certain conditions human beings can safely be used, this is not the case during impact tests and tests reproducing accidents. In the latter it is necessary to use dummies which are as representative as possible of the human body. Therefore the problem to be solved is the optimisation of the representiveness of these dummies relative to a live human being.

To this end the invention proposes an anatomical and physiological structure of a vertebral column having means which permit the simulation of different types of human constitution, as well as the dynamics of the living subject particularly during impacts. The integration of the invention with an anthropomorphous dummy such as described in French Pat. application 7,404,355 (which corresponds to U.S. Pat. application Ser. No. 546,097 filed Jan. 31, 1975) provides a considerable possibility of being representative of most actual cases liable to be studied.

Therefore the invention has for its object an anatomical and physiological structure for an anthropomorphous dummy, more particularly comprising a vertebral column constituted by a superimposition of vertebrae whose number is equal to that of the vertebrae of the human rachis and a variable tension guying.

According to the invention each of these vertebrae comprises a laterally and dorsally supporting member for radial apophyses or processes forming stops for the lateral and rearward movements of the column. In its centre this member has a round hole and four lugs, also having round holes regularly distributed over the periphery thereof alternating with the above-mentioned stops. Intervertebral discs are inserted between each vertebra and are provided with a central opening corresponding with the central holes of the vertebrae. Finally cords for assembling and maintaining in place the superimposed vertebrae pass respectively into each of the above-mentioned central openings and into each of the lugs, whereby the ends thereof are secured to the base of the skull and to the top of the pelvis of the above-mentioned structure.

Moreover, in a preferred embodiment of the invention two supplementary cords are secured to the base of the skull and the top of the pelvis, whereby these two cords pass respectively into each of the lugs framing the dorsal process of the first four cervical vertebrae and in sliding manner into guides located in the centre of the region corresponding to the shoulder blades of the structure.

Moreover, the means for securing the said cords comprise anchoring plates integral respectively with the base of the skull and the top of the pelvis traversed by the ends of the said cords and by stops integral with the cords at their ends cooperating in adjustable manner with the said plates.

Advantageously in this embodiment of the invention the cord relative to the central holes in the vertebrae and the intervertebral discs is inextensible whilst the cords relative to the above-mentioned lugs are slightly elastic. The tension of the said cords can be regulated by means of the said stops. The same applies regarding the supplementary cords which are provided in the area of the shoulder blade and pelvis with tension regulating devices.

The invention will be better understood from reading the following description given in a non-limitative and purely indicative manner and which illustrates the advantages and secondary characteristics of the invention. Reference is made to the attached drawings wherein:

FIG. 1 a general front view of a vertebral column structure according to the invention;

FIGS. 2 and 3 are sectional views along the lines II—II and III—III respectively of FIG. 1;

FIG. 4 is a sectional view along the line IV—IV of FIG. 3.

Figure 1:
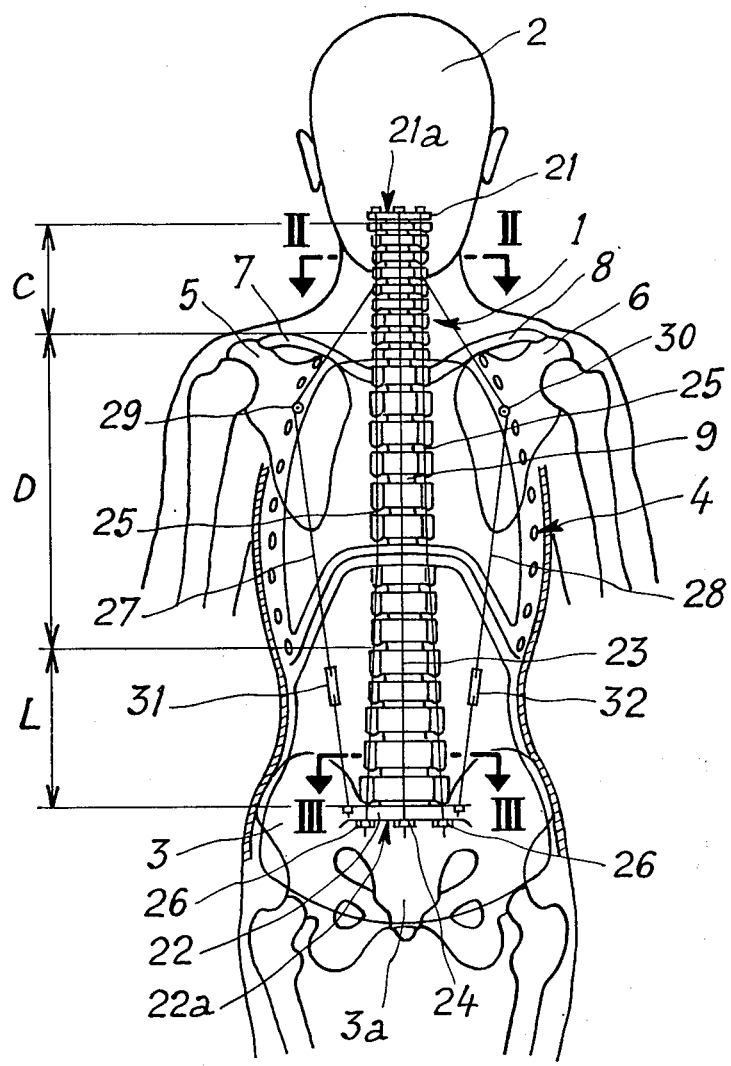

FIG. 1 shows an anthropomorphous dummy whose anatomical representation comprises a vertebral column 1, at the top of which is fitted a skull 2, whilst a pelvis 3 is provided in the lower area thereof. It is also possible to see the sides of a thorax 4 whose connections with the vertebral column are not shown. Finally the shoulder blades 5 and 6 are articulated with collar bones 7 and 8 whose connection with the sternum is not shown. The thoracic girdle can be simplified.

Like that of man, the vertebral column 1 has seven cervical vertebrae C, twelve dorsal vertebrae B and five lumbar vertebrae L. The respective dimensions and more particularly the diameter and height are substantially those of the vertebrae of the average adult, increasing from the cervical vertebrae to the lumbar vertebrae. They are superimposed with intervertebral discs 9 being inserted between each of them.

FIGS. 2, 3 and 4 show in detail the formation of these vertebrae. FIG. 2 which is a plan view of the third cervical vertebra and FIG. 3 which is a plan view of the fourth lumbar vertebra show that the said vertebrae comprise a central member 10 radially supporting two lateral processes 11 and 12 and one dorsal process 13. These processes respectively simulate the transverse and spinous processes constituting in the case of the dummy stops for the lateral and rearward movements of the column when it is bent. As can be seen in FIG. 4, each upper end of the processes 11 abut against the upper end of the adjacent lower vertebra in a bending movement in accordance with A and this limits the rotation of one vertebra relative to that below it and consequently determines the minimum curvature which can be assumed by the column in this bending movement. The same applies regarding processes 12 and 13. Moreover the said central member 10 is provided with a central opening 14 of a counterboring 15 on each of its centring faces of the intervertebral discs 9 adjacent thereto. These discs 9 which are particularly clearly visible in FIG. 4 which shows in crosssection the third, fourth and fifth lumbar vertebrae are made from an elastomer and can therefore be at least partly compressed and deformed following the configuration or bending of the vertebral column. They are also provided with an opening 9a which corresponds with opening 14.

Finally lugs 16, 17, 18 and 19 are regularly distributed around disc 10 of each of the vertebrae alternating with processes 11, 12 and 13. Each of these lugs is provided with a round hole 20.

Returning now to FIG. 1, it can be seen that skull 2 has at its base an anchoring plate 21 integral therewith, whilst pelvis 3 also carries an anchoring plate 22 at the top of the sacrum 3a. By means of anchoring plates 21 and 22 vertebral column 1 is secured to the skull and pelvis. Fixing takes place by means of cords. Firstly a cord 23 traverses the vertebral column 1 in central openings 14 and 9a of the vertebrae and the intervertebral discs, whereby one end of the said cord strikes against the upper face 21a of plate 21 by means of a known device of the stop ring type. It also strikes against face 22a of plate 22 by means of a regulatable device. The latter can for example comprise a nut 24, whereby the corresponding end of the cord terminates with a threaded end fitting. Finally four cords such as those shown at 25, whereby in FIG. 1 the plan of two of the latter coincides with that of cord 23, traverse the entire length of column 1 via holes 20 carried by lugs 16 to 19 described hereinbefore, and are fixed in the same way as cord 23 to plates 21 and 22, i.e., using stop rings and nuts 26. Finally the supplementary cords 27 and 28 are anchored in plates 21 and 22 passing respectively into holes 20 of lugs 16 and 17 of the first four cervical vertebrae and into guides 29 and 30 fixed on the rear face of the area of the shoulder blades 5 and 6 substantially in the median zone thereof. These guides can for example be pulleys whose shaft is anchored in the shoulder blade perpendicular to its rear face.

Tighteners 31 and 32, for example screw tighteners are arranged in conventional manner on each of the cords 27 and 28 between the shoulder blades and the pelvis.

FIGS. 2 to 4 show the different cords in cross-section with their reference numerals.

Finally, it is pointed out that cord 23 is inextensible whereas cords 25, 27 and 28 are slightly extensible.

The function of cord 23 is to maintain the vertebrae and discs 9 in the superimposed position. This regulation of the cord tension by tightening nut 24 makes it possible to simulate all the desired stiffnesses of the vertebral column.

The function of cord 25 is to simulate the action of the intervertebral muscles. The regulation of their tension by nuts 26 also makes it possible to simulate the different forces or tensions of the muscles as encountered in actual practice. The fact that they are elastic makes it possible to simulate even more precisely the above-mentioned muscles.

Finally the function of cords 27 and 28 is the representation of the dorsal muscles. Here again tighteners 31 and 32 make it possible to represent the different forces or tension of the dorsal muscles encountered in human beings. These supplementary cords only pass via the four first cervical vertebrae and maintain, level with the neck, the mobility of the head of the dummy relative to the trunk. They also have a certain extensibility.

It is obvious that the vertebral column of man has a series of successive well-known curvatures. To enable this to be satisfactorily reproduced it is necessary for the dummy to have a thoracoabdominal compensation system which helps to straighten the column and maintain it in place.

It is particularly advantageous to associate a vertebral column of this type with a hydropneumatic thoracoabdominal system such as is described in French Pat. application No. 7,404,355 (which corresponds to U.S. Pat. application Ser. No. 546,097 filed Jan. 31, 1975) because the forces are then transmitted by the said system to the column, maintaining the latter in the rest position and causing deformations and tensions of the cords which can be measured when the dummy undergoes impact tests.

The invention has a particularly important application in the field of research and control of automobile construction material, particularly when studying the static and dynamic behaviour of the occupants of vehicles during acceleration, braking and impact.

It is not limited to the description given hereinbefore but in fact covers all variants which can be made thereto without passing beyond the scope of the invention.

What is claimed is:

1. An anatomical and physiological structure for an anthropomorphous dummy, more particularly comprising a vertebral column constituted by a superimposition of vertebrae whose number is equal to that of the vertebrae of the human rachis, wherein each of the said vertebrae comprises a member which laterally and dorsally supports the radial processes constituting stops relative to the lateral and rearward bending movements of te column, said member is provided in its centre with an opening and has four lugs which are perforated and regularly distributed over the periphery thereof alternating with the said stops, wherein intervertebral discs made from an elastomer material are placed between each vertebra being provided with central openings corresponding with the central openings of the vertebrae, and wherein cords for assembling and maintaining in place the stacked vertebrae pass respectively into each of the central openings and into each of the lugs, their ends being secured to the base of the skull and the top of the pelvis of the said structure.

2. A structure according to claim 1, wherein two supplementary cords are secured to the base of the skull and to the top of the pelvis, these two cords passing respectively into each of the lugs framing the dorsal process of the first four cervical vertebrae and in sliding manner into the guides secured to the centre of the rear face of the region of each of the shoulder blades of the said structure.

3. A structure according to claim 2, wherein the supplementary cords are slightly elastic, being provided with tension regulating devices between the shoulder blade area and the pelvis.

4. A structure according to claim 1, wherein the means for securing said cords comprise anchoring plates respectively integral with the base of the skull and the top of the pelvis traversed by the ends of the said cords and stops fixed to the ends of the cords and cooperating in regulatable manner with the said plates.

5. A structure according to claim 4, wherein the cord relative to the central openings of the vertebrae and the intervertebral discs is inextensible, whilst the cords relative to the lugs are slightly elastic, and wherein the tension of the said cords is regulatable by means of the said stops.

* * * * *